United States Patent
Nagy et al.

(10) Patent No.: US 11,629,310 B2
(45) Date of Patent: Apr. 18, 2023

(54) PURIFICATION OF TRIACYLGLYCERIDE OILS BY AUXILIARY WASHING

(71) Applicant: SOCIETE DES PRODUITS NESTLE S.A., Vevey (CH)

(72) Inventors: Kornel Nagy, La Tour-de-Peilz (CH); Karine Meisser Redeuil, Pully (CH); Marine Nicolas, Morges (CH); Xanthippi Theurillat, Cheseaux-sur-Lausanne (CH)

(73) Assignee: Societe des Produits Nestle S.A., Vevey (CH)

( * ) Notice: Subject to any disclaimer, the term of this patent is extended or adjusted under 35 U.S.C. 154(b) by 0 days.

(21) Appl. No.: 17/415,439

(22) PCT Filed: Sep. 13, 2019

(86) PCT No.: PCT/EP2019/074452
§ 371 (c)(1),
(2) Date: Jun. 18, 2021

(87) PCT Pub. No.: WO2020/126131
PCT Pub. Date: Jun. 25, 2020

(65) Prior Publication Data
US 2022/0081643 A1 Mar. 17, 2022

(30) Foreign Application Priority Data
Dec. 19, 2018 (EP) .................... 18214136

(51) Int. Cl.
*C11B 3/00* (2006.01)
*C11B 7/00* (2006.01)
*B01D 9/00* (2006.01)
*C11B 3/16* (2006.01)

(52) U.S. Cl.
CPC ............. *C11B 3/006* (2013.01); *B01D 9/005* (2013.01); *C11B 3/001* (2013.01); *C11B 3/16* (2013.01); *C11B 7/0075* (2013.01)

(58) Field of Classification Search
CPC . C11B 3/006; C11B 3/001; C11B 3/16; C11B 7/0075; B01D 9/005
See application file for complete search history.

(56) References Cited

FOREIGN PATENT DOCUMENTS

| EP | 2586854 | 5/2013 | | |
|---|---|---|---|---|
| EP | 2471897 A4 | * | 3/2015 | ............. C11B 3/001 |
| WO | WO-9526391 A1 | * | 10/1995 | ............ C11B 7/0083 |
| WO | 2014012759 | | 1/2014 | |
| WO | 2018156013 | | 8/2018 | |
| WO | WO-2019175256 A1 | * | 9/2019 | ............. B01D 21/02 |

OTHER PUBLICATIONS

Zelinkova et al. "Fatty acid esters of 3-chloropropane-1,2-diol in edible oils" Food Additives and Contaminants, 2006, vol. 23, No. 12, pp. 1290-1298.

* cited by examiner

*Primary Examiner* — Yate' K Cutliff
(74) *Attorney, Agent, or Firm* — K&L Gates LLP

(57) ABSTRACT

The present invention provides an improved method for purification of a primary triacylglyceride oil comprising the steps of washing the primary triacylglyceride oil, trapping assisted removal of chlorinated precursors of MCPDEs by admixing the primary triacylglyceride oil with an auxiliary trapping agent; crystallising the auxiliary trapping agent or the primary triacylglyceride oil; and separating solid and liquid phases of the product.

28 Claims, 10 Drawing Sheets

PURIFICATION OF TRIACYLGLYCERIDE OILS BY AUXILIARY WASHING

CROSS REFERENCE TO RELATED APPLICATIONS

The present application is a National Stage of International Application No. PCT/EP2019/074452, filed on Sep. 13, 2019, which claims priority to European Patent Application No. 18214136.6, filed on Dec. 19, 2018, the entire contents of which are being incorporated herein by reference.

FIELD OF THE INVENTION

The present invention relates to the purification of oils. In particular, the invention relates to the purification of triacylglyceride oils from contaminant chlorinated precursors of monochloropropandiol esters (MCPDEs) and/or MCPDEs themselves.

BACKGROUND TO THE INVENTION

3-Halogen-1,2-propandiols, in particular 3-monochloro-1,2-propandiol (3-MCPD), are known contaminants in foods (Food Addit. Contam. (2006) 23: 1290-1298). For example, studies have indicated that 3-MCPD may be carcinogenic to rats if administered at high doses (Evaluation of Certain Food Additives and Contaminants, World Health Organisation, Geneva, Switzerland (1993) 267-285; Int. J. Toxicol. (1998) 17: 47).

3-MCPD was originally found in acid-hydrolysed vegetable protein (acid-HVP; Z. Lebensm.-Unters. Forsch. (1978) 167: 241-244). More recently, it was found that refined edible oils may contain 3-MCPD in its fatty acid ester form, but only very little amounts of free 3-MCPD (Food Addit. Contam. (2006) 23: 1290-1298). The European Food Safety Authority (EFSA) has recommended that 3-MCPD esters are treated as equivalent to free 3-MCPD in terms of toxicity (European Food Safety Authority (2008)).

It has been reported that chlorination of acylglycerides can occur at very high temperatures, for example during the final step of the oil refining process, or deodorisation, under which oils may be heated under vacuum (3-7 mbar) up to 260-270° C. This may result in the formation of fatty acid esters of MCPD.

Effective mitigation routes for MCPD esters are limited and pose a challenge to the plant oil refining industry. Currently, the presence of 3-MCPD in refined oils is carefully monitored and oils with 3-MCPD content above a threshold value are discarded in order to ensure full compliance with EFSA recommendations. One key complication hindering effective mitigation of these contaminants is that the chlorine carrying precursors are not removed before the deodorisation step and thus can act as the source/donor of chlorine during the deodorisation step.

As 3-MCPD may occur in many refined commercially important oils, such as plant oils, there exists a significant need for improved methods for removing and/or avoiding the production of such contaminants during oil refining.

SUMMARY OF THE INVENTION

The inventors have developed a method by which MCPD ester generation during the process of oil refining can be substantially reduced or prevented.

The inventors have developed a method for the removal or reduction of certain chlorinated substances from crude or partially refined vegetable oils. This purification process has a positive impact on the ultimately derived, heat treated oils MCPD content.

The principle of the method is to deploy a washing step with an auxiliary oil, purification with an auxiliary trapping agent or the combination thereof that allows the physical separation of the chlorinated substances from the oil subject to purification. As a result, the chlorinated substances are solubilized in either or both of the washing or auxiliary trapping agent fraction of the oil and can be thus separated from the oil to be refined. The application scope of the invention includes crude or partially refined triacylglycerol oils for example but not limited to palm oil, palm stearin, palm olein and their various fractions, palm kernel oil, coconut oil, sunflower oil, high oleic sunflower oil and their variants, canola/rapeseed oil, soybean oil, fish oil, algae oil, cocoa butter and any mixtures/blends thereof.

The washing treatment includes a treatment with a food grade auxiliary oil that is substantially free of chlorinated substances and/or polar substances that could interfere with the benefit of a potentially used auxiliary trapping agent. The auxiliary trapping agent based purification step can include a treatment with auxiliary trapping agent higher in polarity and different in melting temperature from the triacylglyceride oil subject to purification.

During purification with auxiliary trapping agent the triacylglyceride oils are subjected to treatment with auxiliary agents to trap polar chlorinated substances, which may for example be an active source of chlorine during oil refining. The trapped chlorinated substances may then be physically separated by crystallising either the auxiliary agents from the oil or vice versa. The crystallisation may be assisted through use of a range of auxiliary agents that can be chosen based on melting temperature and/or polarity, for example. Depending on the composition and physicochemical characteristics of the oil, the removal of the chlorinated precursors is assisted by using a more polar auxiliary lipid trapping agent that facilitates both the solubilisation of the MCPDE precursors and at the same time the physical separation process (e.g. either by crystallising out from the bulk or remaining a liquid supernatant upon cooling). The choice of the auxiliary trapping agent may be a single component or blends of components, such as monoacylglycerides, diacylglycerides and other lipid soluble substances that are more polar than the original primary oil.

Overall, by any of the above referred means, once removed, the potential chlorine donors are no longer available for the generation of chlorinated compounds, such as MCPD esters and MCPD di-esters during the heating steps in oil refinement. Product oils low in chlorinated substances are thereby obtained and the purified oils may be subjected to various refining practices, such as heat treatment and deodorisation, in order to produce refined oils low in or free from MCPDEs.

Further benefits of the method of the invention is that it enables lower temperatures to be used in deodorisation of the oil, which both 1) reduces trans-fatty acid formation (trans fat formation at high temperature is reviewed in Baley's industrial oil and fat products; Sixth Edition; Volume 5 Edible Oil and Fat Products: Processing Technologies; Chapter 8 Deodorization; section 3. Refined oil quality, subsection 3.2 Fat isomerization and degradation products).

2) reduces formation of glycidyl esters (see the summary of the elimination methods of GEs in "Glycidyl fatty acid esters in refined edible oils: a review on formation, occurrence, analysis, and elimination methods" in Comprehensive Reviews in Food Science and Food-Safety; vol. 16, 263-281; 2017).

Accordingly, in one aspect the invention provides a method for purification of a primary triacylglyceride oil, wherein the quantity of organic chlorinated precursors of monochloropropandiol esters (MCPDEs) is reduced in the purified triacylglyceride oil compared to the starting primary triacylglyceride oil, comprising the steps:
(a) admixing a primary triacylglyceride oil with an auxiliary oil, wherein
  (i). the melting temperatures of the auxiliary oil and the primary triacylglyceride oil are substantially different;
  (ii). the auxiliary oil is soluble in the primary triacylglyceride oil; and
  (iii). the auxiliary oil is substantially free of
    i. hydrolytic decomposition product of triacylglycerides that have a similar or lower melting temperature than the melting temperature of the primary triacylglyceride oil, preferably free of all hydrolytic decomposition product of triacylglycerides; or
    ii. polar lipids that have a similar or lower melting temperature than the melting temperature of the auxiliary oil, preferably free of all polar lipids; or
    iii. all polar organic substances
(b) crystallizing either
  (i). the primary triacylglyceride oil by cooling the mixture of step (a) below the melting temperature of the primary triacylglyceride oil but above the melting temperature of the auxillary oil, wherein the auxiliary oil has a lower melting temperature than the primary triacylglyceride oil due to its higher degree of unsaturation or due it its shorter fatty acid chains in its constituents, or
  (ii). the auxiliary oil by cooling the mixture of step (a) below the melting temperature of the auxiliary oil but above the melting temperature of the primary triacylglyceride oil, wherein the auxiliary oil has a higher melting temperature than the primary triacylglyceride oil due to its lower degree of unsaturation or due its longer fatty acid chains in its constituents;
(c) separating solid and liquid phases of the product of step (b);

In one embodiment, the melting temperature of the auxiliary oil is at least 20° C. lower than the melting temperature of the primary triacylglyceride oil. In a preferred embodiment, the melting temperature of the auxiliary oil is at least 30° C. lower than the melting temperature of the primary triacylglyceride oil.

In another embodiment, the melting temperature of the auxiliary oil is at least 20° C. higher than the melting temperature of the primary triacylglyceride oil. In a preferred embodiment, the melting temperature of the auxiliary oil is at least 30° C. higher than the melting temperature of the primary triacylglyceride oil.

In another embodiment, the auxiliary washing oil is substantially free of hydrolytic decomposition product of triacylglycerides that have a similar or higher melting temperature than the melting temperature of the primary triacylglyceride oil.

In another aspect the invention provides a method for purification of a primary triacylglyceride oil comprising the steps:

(d) admixing the primary triacylglyceride oil with an auxiliary trapping agent, wherein the melting temperatures of the primary triacylglyceride oil and the auxiliary trapping agent are substantially different, wherein the auxiliary trapping agent is soluble in the primary triacylglyceride oil, and wherein the auxiliary trapping agent is more polar than the primary triacylglyceride oil;
(e) crystallizing
  i. the auxiliary trapping agent by cooling the mixture of step (d) below the melting temperature of the auxiliary trapping agent, wherein the auxiliary trapping agent has a higher melting temperature than the primary triacylglyceride oil; or
  ii. the primary triacylglyceride oil by cooling the mixture of step (d) below the melting temperature of the primary triacylglyceride oil, wherein the primary triacylglyceride oil has a higher melting temperature than the auxiliary trapping agent; and
(f) separating solid and liquid phases of the product of step (e).

In one embodiment, all the steps a, b, c, d, e, and f are performed consecutively.

In one embodiment, the melting temperature of the auxiliary trapping agent is at least 10° C. higher than the melting temperature of the primary triacylglyceride oil. In a preferred embodiment, the melting temperature of the auxiliary trapping agent is at least 20° C. higher than the melting temperature of the primary triacylglyceride oil.

In another embodiment, the melting temperature of the primary triacylglyceride oil is at least 10° C. lower than the melting temperature of the auxiliary trapping agent. In a preferred embodiment, the melting temperature of the primary triacylglyceride oil is at least 20° C. lower than the melting temperature of the auxiliary trapping agent.

In one embodiment the quantity of said organic chlorinated precursors of MCPDEs is reduced in the purified triacylglyceride oil compared to the starting triacylglyceride oil.

In one embodiment the mass range of the organic chlorinated precursors is in the range of 600-1000 Dalton.

In one embodiment, the starting primary triacylglyceride oil is crude triacylglyceride oil.

In one embodiment, the primary triacylglyceride oil has not been refined before step (a). In one embodiment, the primary triacylglyceride oil has not been degummed before step (a). In one embodiment, the primary triacylglyceride oil has not been bleached before step (a). In one embodiment, the primary triacylglyceride oil has not been fractionated before step (a).

In another embodiment, the primary triacylglyceride oil has not been refined before step (d). In one embodiment, the primary triacylglyceride oil has not been degummed before step (d). In one embodiment, the primary triacylglyceride oil has not been bleached before step (d). In one embodiment, the primary triacylglyceride oil has not been fractionated before step (d).

In a preferred embodiment, the primary triacylglyceride oil has not been deodorised before step (a).

In a preferred embodiment, the primary triacylglyceride oil has not been deodorised before step (d).

In one embodiment, the primary triacylglyceride oil is subjected to preliminary cleaning before step (a). In one embodiment, the primary triacylglyceride oil is subjected to preliminary refining before step (a). In one embodiment, the primary triacylglyceride oil is subjected to fractionation before step (a). In one embodiment, the primary triacylglyceride oil is subjected to hydrogenation before step (a). In one embodiment, the primary triacylglyceride oil is subjected to interesterification before step (a).

In one embodiment, the primary triacylglyceride oil is subjected to preliminary cleaning before step (d). In one embodiment, the primary triacylglyceride oil is subjected to preliminary refining before step (d). In one embodiment, the primary triacylglyceride oil is subjected to fractionation before step (d). In one embodiment, the primary triacylglyceride oil is subjected to hydrogenation before step (d). In one embodiment, the primary triacylglyceride oil is subjected to interesterification before step (d).

In one embodiment, the primary triacylglyceride oil is a plant oil, animal oil, fish oil or algal oil.

In a preferred embodiment, the primary triacylglyceride oil is a plant oil, preferably wherein the plant oil is selected from the group consisting of sunflower oil, corn oil, canola oil, soybean oil, coconut oil, palm oil, palm kernel oil and cocoa butter.

In another embodiment, the primary triacylglyceride oil is palm oil or fractionated palm oil such palm olein, palm stearin, mid-fraction.

In one embodiment, the pH of the primary triacylglyceride oil is adjusted before step (a). The pH may be adjusted before step (a) to decrease the polarity of chlorinated precursors of MCPDEs. In one embodiment, the pH of the primary triacylglyceride oil is decreased by about 0.5-2.0, for example decreased by about 0.5, 1.0, 1.5 or 2.0. In another embodiment, the pH of the primary triacylglyceride oil is increased by about 0.5-2.0, for example increased by about 0.5, 1.0, 1.5 or 2.0.

In another embodiment, the pH of the primary triacylglyceride oil is adjusted before step (d). The pH may be adjusted before step (d) to decrease the polarity of chlorinated precursors of MCPDEs. In one embodiment, the pH of the primary triacylglyceride oil is decreased by about 0.5-2.0, for example decreased by about 0.5, 1.0, 1.5 or 2.0. In another embodiment, the pH of the primary triacylglyceride oil is increased by about 0.5-2.0, for example increased by about 0.5, 1.0, 1.5 or 2.0.

In one embodiment, the pH of the primary triacylglyceride oil is adjusted by addition of citric acid or phosphoric acid. In another embodiment, the pH of the primary triacylglyceride oil is adjusted by addition of a bicarbonate salt or a hydroxide salt, such as sodium bicarbonate or sodium hydroxide.

In one embodiment, the primary triacylglyceride oil is pre-treated before step (a), for example the primary triacylglyceride oil is admixed with acidified water before step (a). Similar pH treatment steps are commonly practised in physical refining (see, for example, "Degumming of oils and fats" in The Lipid Handbook, Third Edition by Frank D. Gunstone, John L. Harwood, Albert J. Dijkstra; Baley's industrial oil and fat products; Sixth Edition; Volume 5 Edible Oil and Fat Products: Processing Technologies; Chapter 1 A Primer on Oils Processing Technology; section 6. Degumming, Lecithin Processing, and Physical Refining Pretreatment). The solubilised acid content may be increased before step (a), for example to increase the protonated form and/or polarity of chlorinated precursors of MCPDEs. In one embodiment, the primary triacylglyceride oil is admixed with water acidified by addition of citric acid or phosphoric acid. For example, 0.1-1 wt % acid solution containing 70-85% phosphoric acid can be used.

In another embodiment, the primary triacylglyceride oil is pre-treated before step (d), for example the primary triacylglyceride oil is admixed with acidified water before step (d).

In another embodiment, the primary triacylglyceride oil is admixed with a base (such as caustic soda, NaOH) or its water solution. Similar pH treatment steps are commonly practised in chemical refining/neutralisation of oils (see, for example, "Alkali refining of oils and fats" in The Lipid Handbook, Third Edition by Frank D. Gunstone, John L. Harwood, Albert J. Dijkstra; Baley's industrial oil and fat products; Sixth Edition; Volume 5 Edible Oil and Fat Products: Processing Technologies; Chapter 1 A Primer on Oils Processing Technology; section 7. Caustic Refining). The solubilised base content may be introduced before step (a) or step (d), for example to increase the dissociated form and/or polarity of chlorinated precursors of MCPDEs. In one embodiment, the primary triacylglyceride oil is admixed with water containing a bicarbonate salt or a hydroxide salt, such as sodium bicarbonate or sodium hydroxide.

In another embodiment, the primary triacylglyceride oil is pre-treated before step (a) with a combination of both acidic and basic water treatment (e.g. as the previously described acidic and basic water treatments).

In another embodiment, the primary triacylglyceride oil is pre-treated before step (d) with a combination of both acidic and basic water treatment (e.g. as the previously described acidic and basic water treatments).

In one embodiment, the acid/base content of the primary triacylglyceride oil is adjusted under high-shear mixing.

In one embodiment, the method further comprises one or more of the following steps subsequent to step (a):
- (g) one or more processes selected from the group consisting of physical or chemical refining, degumming, and bleaching;
- (h) optionally deodorising the product of step (c), preferably wherein the deodorising is vacuum steam deodorising; and
- (i) optionally deodorising the product of step (c), preferably wherein the deodorising is vacuum steam deodorising; and
- (j) optionally fractionating the product of steps (g), (h).

In another embodiment, the method further comprises one or more of the following steps subsequent to step (d):
- (k) one or more processes selected from the group consisting of physical or chemical refining, degumming, and bleaching;
- (l) optionally deodorising the product of step (f), preferably wherein the deodorising is vacuum steam deodorising; and
- (m) optionally deodorising the product of step (k), preferably wherein the deodorising is vacuum steam deodorising; and
- (n) optionally fractionating the product of steps (l) (m).

In another aspect, the invention provides a triacylglyceride oil obtainable by the method of the invention.

In one embodiment, the difference in log $P_{oct/wat}$ between the auxiliary trapping agent and the primary triacylglyceride oil is at least 1. In a preferred embodiment, the difference in log $P_{oct/wat}$ between the auxiliary trapping agent and the primary triacylglyceride oil is at least 2.

In one embodiment, the auxiliary trapping agent comprises a glyceride. Thus, the auxiliary trapping agent may contain a glyceride and may also contain other compounds, although the auxiliary trapping agent is preferably primarily made up of glycerides. In another embodiment, the auxiliary trapping agent is a glyceride.

In one embodiment, the auxiliary trapping agent comprises at least one compound selected from the group consisting of a monoacylglyceride, a diacylglyceride and a free fatty acid. In another embodiment, the auxiliary trapping agent consists of one or more compounds selected from the group consisting of a monoacylglyceride, a diacylglyceride and a free fatty acid.

In one embodiment, the auxiliary trapping agent comprises a monoacylglyceride and/or a diacylglyceride. In another embodiment, the auxiliary trapping agent consists of a monoacylglyceride and/or a diacylglyceride.

In one embodiment, the auxiliary trapping agent comprises at least 60 wt %, 70 wt %, 80 wt %, 90 wt %, 95 wt %, 96 wt %, 97 wt %, 98 wt %, 99 wt % or 100 wt % monoacylglycerides and/or diacylglycerides.

In one embodiment, the amount of auxiliary trapping agent admixed with the primary triacylglyceride oil is at least 2 wt %, 3 wt %, 4 wt %, 5 wt %, 6 wt %, 7 wt %, 8 wt %, 9 wt % or 10 wt % of the primary triacylglyceride oil. In one embodiment, the amount is between 8 wt % and 12 wt % for example for palm oil.

In one embodiment, the auxiliary trapping agent comprises less than 2 wt % triacylglycerides.

In a preferred embodiment, the auxiliary trapping agent does not comprise any triacylglycerides.

In one embodiment, fatty acid chains of the auxiliary trapping agent are saturated or monounsaturated. In a preferred embodiment, fatty acid chains of the auxiliary trapping agent are all saturated.

In one embodiment, fatty acid chains of the auxiliary trapping agent have a chain length of at least 12. In another embodiment, fatty acid chains of the auxiliary trapping agent have a chain length of at least 14. In another embodiment, fatty acid chains of the auxiliary trapping agent have a chain length of at least 16. In another embodiment, fatty acid chains of the auxiliary trapping agent have a chain length of at least 18.

In one embodiment, fatty acid chains of the auxiliary trapping agent have a chain length of 12. In another embodiment, fatty acid chains of the auxiliary trapping agent have a chain length of 14. In a preferred embodiment, fatty acid chains of the auxiliary trapping agent have a chain length of 16. In another preferred embodiment, fatty acid chains of the auxiliary trapping agent have a chain length of 18.

In one embodiment, the auxiliary trapping agent comprises at least one compound selected from the group consisting of monostearin, monopalmitin, monomyristin, monolaurin, distearin, dipalmitin, dimyristin, dilaurin, stearic acid, palmitic acid, myristic acid and lauric acid. In another embodiment, the auxiliary trapping agent consists of one or more compounds selected from the group consisting of monostearin, monopalmitin, distearin, dipalmitin, stearic acid, palmitic acid, myristic acid and lauric acid.

In another embodiment, the auxiliary trapping agent comprises at least one compound selected from the group of diacylglycerols with different fatty acyl chains including stearic, palmitic, myristic or lauric acids esterified on the glycerol backbone.

In one embodiment, the auxiliary trapping agent comprises monostearin. In another embodiment, the auxiliary trapping agent is monostearin.

In one embodiment, the admixing of step (a) comprises heating to a temperature greater than the melting temperatures of the primary triacylglyceride oil and auxiliary oil, and/or homogenising the mixture.

In one embodiment, heating is not required in step (a).
In one embodiment, heating is not required in step (c).

In one embodiment, the admixing of step (c) comprises heating to a temperature greater than the melting temperatures of the primary triacylglyceride oil and auxiliary trapping agent, and/or homogenising the mixture.

In one embodiment, the admixing of step (a) comprises incubating the primary triacylglyceride oil and auxiliary oil at a temperature greater than the melting temperatures of the primary triacylglyceride oil and auxiliary oil, and/or homogenising the mixture.

In one embodiment, the admixing of step (c) comprises incubating the primary triacylglyceride oil and auxiliary trapping agent at a temperature greater than the melting temperatures of the primary triacylglyceride oil and auxiliary trapping agent, and/or homogenising the mixture.

In one embodiment, the separating of steps (c) and (f) comprises centrifuging, decanting and/or filtering. In a preferred embodiment, the separating of steps (c) and (f) comprises centrifuging.

Figure 1:
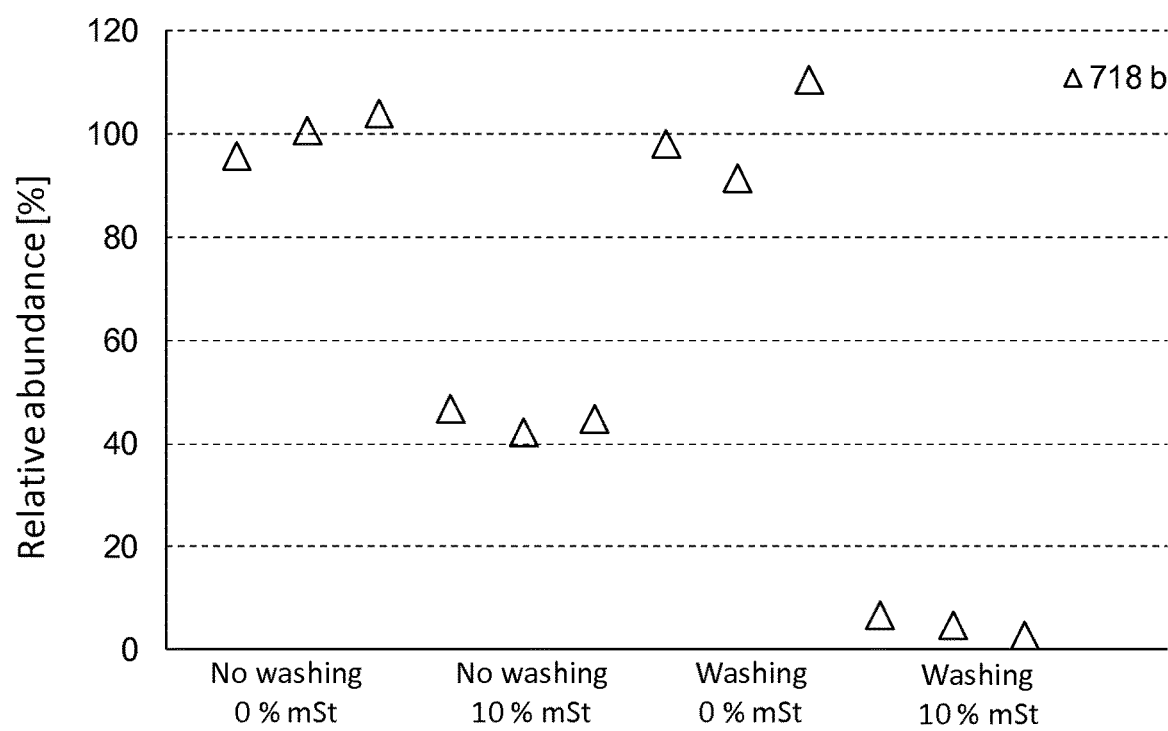
FIG. 1

Removal of chlorinated precursors of MCPDEs at m/z 718.61357 in crude solvent extracted palm oil. The recorded peak areas of this precursor were extracted at 10 ppm m/z window, then they were normalized by defining the averaged peak areas in the starting material (without mitigation, no monostearin) as 100%. The obtained results show that the monostearin based trapping can remove in this case about 50% of 718 precursors. Upon the combination of washing+ monostearin trapping however, the efficacy of mitigation increases to removing more than 90% of 718.

FIG. 2

Removal of chlorinated precursors of MCPDEs at m/z precursors 642.52273; 716.59653; 700.60161; 850.64170 in industrially produced crude palm oil with only monostearin based trapping and with a combination of washing and monostearin based trapping.

FIG. 3

Effect of adding polar interferences (free fatty acids and monoglycerides) to industrially produced crude palm oil is shown on the mitigation efficacy of precursors m/z 642.52273; 716.59653; 700.60161; 850.64170.

FIG. 4

Effect of adding polar interferences (free fatty acids and monoglycerides) to industrially produced crude palm oil is shown on the mitigation efficacy of MCPDEs. (dipalmitoyl-MCPD=PP-MCPD, palmitoyl-oleyl-MCPD=PO-MCPD, dioleyl-MCPD=OO-MCPD, oleyl-linoleyl-MCPD=OL-MCPD)

FIG. 5

Dose-response effect of adding polar interferences (monoglycerides) to crude palm stearin is shown on the mitigation efficacy of chlorinated precursors of MCPDEs.

FIG. 6

The overall step by step mitigation with washing and monostearin and their synergistic effect on the resulting MCPDE content of the oils is shown in industrially produced crude palm oil.

FIG. 7

The distribution of mono-Olein and mono-Linolein is showed in the liquid and solid phase of crystallized mixture of crude palm stearin and pressed crude sunflower oil.

FIG. 8

The beneficial effect of washing is shown on the reduced abundance of mono-Olein and mono-Linolein in crude palm oil.

FIG. 9

The beneficial effect of washing and mono-Stearin based trapping is shown by plotting the sum relative peak areas of MPCD diesters in the case of palm oil.

FIG. 10

The beneficial effect of washing and mono-Stearin based trapping is shown by plotting the sum relative peak areas of MPCD diesters in the case of degummed palm oil.

DETAILED DESCRIPTION OF THE INVENTION

The terms "comprising", "comprises" and "comprised of" as used herein are synonymous with "including" or "includes"; or "containing" or "contains", and are inclusive or open-ended and do not exclude additional, non-recited members, elements or steps. The terms "comprising", "comprises" and "comprised of" also include the term "consisting of".

The term "substantially free" as used herein means containing less than 1% weight percent on a dry matter basis, preferably less than 0.2% and more preferably less than 0.05%.

The term "substantially different melting temperature/melting point" as used herein means there is a more than 15° C., preferably 20° C., more preferably 30° C. difference in the melting temperatures of the two materials.

The term "similar melting temperature/melting point" as used herein means there is less or equal than 15° C. difference in the melting temperatures of the two materials.

Purification

The purification is particularly suitable for removing contaminants such as chlorinated precursors of monochloropropandiol esters (MCPDEs) and/or MCPDEs themselves (e.g. chlorinated precursors of 3-monochloropropan-1,2-diol esters (3-MCPDEs) and/or 3-MCPDEs themselves) from a starting primary triacylglyceride oil (i.e. a triacylglyceride oil immediately before it is subjected to steps (a) or step (d) of the method of the invention).

3-Halogen-1,2-propandiols, in particular 3-monochloro-1,2-propandiol (3-MCPD), are known contaminants in foods (Food Addit. Contam. (2006) 23: 1290-1298). For example, studies have indicated that 3-MCPD may be carcinogenic to rats if administered at high doses (Evaluation of Certain Food Additives and Contaminants, World Health Organisation, Geneva, Switzerland (1993) 267-285; Int. J. Toxicol. (1998) 17: 47). However, it has also been discovered that refined edible oils may contain 3-MCPD in its fatty acid ester form, while only containing very little amounts of free 3-MCPD (Food Addit. Contam. (2006) 23: 1290-1298). The European Food Safety Authority (EFSA) has recommended that 3-MCPD esters are treated as equivalent to free 3-MCPD in terms of toxicity (European Food Safety Authority (2008)).

It is well known that dehalogenation reactions can occur during thermal processes. For example, chlorine has been shown to leave chemical components as hydrogen chloride (gas) upon the input of sufficient activation energy, which is abundant during the deodorisation of vegetable oils at high temperatures (e.g. up to 270° C.). The inventors believe that hydrogen chloride may be evolved during oil refining from chlorine-containing compounds inherently present in the starting materials of the triacylglyceride oil refining process, for example plant materials.

Indeed, it has been suggested that MCPD generation reactions increase exponentially (>150° C.) and go to completion in a short time period.

Without wishing to be bound by theory, it is suggested that mechanistically, the MCPD di-esters may be formed during oil refinement via the protonation of the terminal ester group of triacylglycerides (TAG), which represent about 88-95% of total glycerides in most vegetable oils, through interaction with hydrogen chloride evolved during oil refining. The formed oxonium cation can then undergo intramolecular rearrangement, followed by nucleophilic substitution of chloride ion and the release of a free fatty acid and an MCPD di-ester.

Once removed through use of the method of the invention, the potential chlorine donors are no longer available for the generation of chlorinated compounds, such as MCPD esters during the heating steps in oil refinement. Product oils low in chlorinated substances are thereby obtained and the purified oils may be subjected to various refining practices, such as heat treatment and deodorisation, in order to produce refined oils low in or free from MCPDEs.

Thus, in one embodiment the quantity of chlorinated precursors of monochloropropandiol esters (MCPDEs) is reduced in the purified triacylglyceride oil compared to the starting triacylglyceride oil.

In another embodiment, the quantity of chlorinated precursors of monochloropropandiol esters (MCPDEs) is reduced in the purified triacylglyceride oil by at least 40%, 50%, 60%, 70%, 80%, 90%, 95%, 96%, 97%, 98% or 99% compared to the starting triacylglyceride oil.

Refined oils produced using the method of the invention may contain, for example, less than 3 ppm, 1 ppm, less than 0.5 ppm, or preferably less than 0.3 ppm MCPDEs.

Quantities of MCPDEs and their chlorinated precursors may be readily analysed using protocols well known in the art. For example, liquid chromatography/mass spectrometry (LC/MS)-based approaches are suitable for analysing levels of MCPDEs and their chlorinated precursors, as shown in the present Examples. Example chlorinated precursors of MCPDEs include the known chlorinated precursors with m/z 702.61807; 716.59723; 718. 61357; 734.60809; 776.581271 and 804.57813 (Food Additives and Contaminants in Vol. 28, No. 11, November 2011, 1492-1500).

In one embodiment, the primary triacylglyceride oil input into step (a) or (d) of the method of the invention is crude triacylglyceride oil.

The term "crude oil" as used herein may refer to an unrefined oil. For example, in some embodiments, the triacylglyceride oil input into step (a) or (d) of the method of the invention has not been refined, degummed, bleached and/or fractionated. In a preferred embodiment, the triacylglyceride oil has not been deodorised before steps (a) or (d).

In some embodiments, the primary triacylglyceride oil is subjected to preliminary processing before step (a) or (d), such as preliminary cleaning. However, any processes carried out on the primary triacylglyceride oil before step (a) or (d) preferably do not involve heating the triacylglyceride oil, for example to a temperature greater than 100° C., 150° C., 200° C. or 250° C. In some embodiments, the primary triacylglyceride oil is subjected to preliminary refining, fractionation, hydrogenation and/or interesterification before step (a) or (d).

Triacylglyceride Oil

The term "triacylglyceride" can be used synonymously with "triglyceride". In these compounds, the three hydroxyl groups of glycerol are each esterified by a fatty acid.

Oils that may be purified using the method of the invention comprise triacylglycerides and include plant oil, animal oil, fish oil, algal oil and combinations thereof.

As used herein, the term "triacylglyceride oil" is synonymous with "primary triacylglyceride oil". The primary triacylglyceride oils is the oil to be purified.

In a preferred embodiment, the primary triacylglyceride oil is a plant oil. In a preferred embodiment, the primary triacylglyceride oil is at least partially solvent extracted.

Example, plant oils include sunflower oil, corn oil, canola oil, soybean oil, coconut oil, palm oil, palm kernel oil and cocoa butter.

In one embodiment, the plant oil is palm oil, its fraction including but not limited to palm olein, palm stearin and mid-fraction.

Polar Lipids

As used herein, polar lipids are lipophilic compounds that are more polar than the triacylglycerides. They can be sorted into two classes:
1) Hydrolytic decomposition products of triacylglycerols: these molecules include partial glycerides such as monoacylglycerol, diacylglycerols and free fatty acids.
2) Lipophylic substances with polar functional groups that cannot be derived by degradation of triacylglycerides. These include: glycerophospholipids or simply phospholipids comprising phosphatidylcholines, phosphatidylethanolamines, phosphatidylserines, phosphatidylinositols and phosphatidic acids and sphingolipids and various sachharolipids.

Melting Temperature

The term "melting temperature" as used herein may refer to the temperature at which a solid changes state from solid to liquid at a pressure of 100 kPa. For example, the melting temperature may be the temperature at which a solid changes state from solid to liquid at a pressure of 100 kPa when heated at 2° C. per minute.

The skilled person is readily able to select suitable methods for the determination of the melting temperature of the triacylglyceride oil.

For example, apparatus for the analysis of melting temperatures may consist of a heating block or an oil bath with a transparent window (e.g. a Thiele tube) and a magnifier. A sample of the solid may be placed in a thin glass tube and placed in the heating block or immersed in the oil bath, which is then gradually heated. The melting of the solid can be observed and the associated melting temperature noted.

For fats and oils with highly complex triacylglycerol composition, the method of Slip Melting Point is a commonly used reference (AOCS Official method Cc 3-25).

Further Refinement

As the chlorine precursors are depleted by the method of the invention, heating during any subsequent refinement processes will not cause significant generation of unwanted chlorinated compounds, such as the MCPDEs.

In one embodiment, the method further comprises one or more processes selected from the group consisting of physical or chemical refining, degumming, and bleaching subsequent to step (a) or step (d).

In one embodiment, the method further comprises deodorisation subsequent to step (a) or step (d), preferably wherein the deodorisation is vacuum steam deodorisation.

In one embodiment, the method further comprises fractionation subsequent to step (a) or step (d).

Processes for carrying out refinement, degumming, bleaching, deodorisation and fractionation are well known in the art.

By way of example, refinement of plant oil, such as vegetable oil, typically consists of physical refining or chemical refining.

In efforts aimed at increased sustainability, oil refineries have modified their plant oil processing lines in the past few decades for the minimisation of energy expenditure (economisers) and the reduction of waste. However, the steps of these two refining processes have essentially remained the same.

Physical refining is essentially an abridged form of chemical refining and was introduced as the preferred method of palm oil refining in 1973. It may be a three step continuous operation where the incoming oil is pre-treated with acid (degumming), cleansed by being passed through adsorptive bleaching clay, and then subjected to steam distillation. This process allows for the subsequent deacidification, deodorisation and decomposition of carotenoids unique to palm oil (i.e. the crude oil is deep red in colour, unlike other vegetable oils). Given the lack of neutralisation step in physical refining, refined bleached (RB) oil produced from a physical refinery contains nearly the same free fatty acid (FFA) levels as found in the crude oil.

Neutralised bleached (NB) oil from a chemical refinery and RB palm oil are comparable pre-deodorisation in every other aspect.

The heat bleaching unit operation is the main source of loss in the oil refining process resulting in 20-40% reduction in oil volume post filtration. The process typically lasts for about 30-45 min and typically takes place under 27-33 mbar vacuum at a temperature of 95-110° C.

Heat bleached oil may then be rerouted in piping to a deaerator that aides in the removal of dissolved gases, as well as moisture, before being sent to a deodorisation tower.

A bleaching step may comprise heating the oil and cleaning the oil by passing it through adsorptive bleaching clay.

A deodorisation step may comprise steam distillation.

The skilled person will understand that they can combine all features of the invention disclosed herein without departing from the scope of the invention as disclosed.

Preferred features and embodiments of the invention will now be described by way of non-limiting examples.

The practice of the present invention will employ, unless otherwise indicated, conventional techniques of chemistry, biochemistry, molecular biology, microbiology and immunology, which are within the capabilities of a person of ordinary skill in the art. Such techniques are explained in the literature. See, for example, Sambrook, J., Fritsch, E. F. and Maniatis, T. (1989) Molecular Cloning: A Laboratory Manual, 2nd Edition, Cold Spring Harbor Laboratory Press; Ausubel, F. M. et al. (1995 and periodic supplements) Current Protocols in Molecular Biology, Ch. 9, 13 and 16, John Wiley & Sons; Roe, B., Crabtree, J. and Kahn, A. (1996) DNA Isolation and Sequencing: Essential Techniques, John Wiley & Sons; Polak, J. M. and McGee, J. O'D. (1990) In Situ Hybridization: Principles and Practice, Oxford University Press; Gait, M. J. (1984) Oligonucleotide Synthesis: A Practical Approach, IRL Press; and Lilley, D. M. and Dahlberg, J. E. (1992) Methods in Enzymology: DNA Structures Part A: Synthesis and Physical Analysis of DNA, Academic Press. Each of these general texts is herein incorporated by reference.

EXAMPLES

Example 1

Materials and Methods

Production of Solvent Extracted Crude Palm Oil 1.8 kg frozen, whole, intact palm fruit was thawed at room temperature. The kernels were removed from the fruit manually using a scalpel. 4 L of extraction solution was prepared by mixing 2 L of 2-propanol and 2 L of n-hexane. 1.4 kg of palm pulp including the fruit flesh and skin was mixed, pureed and homogenised with 2 L of extraction solution using a commercial immersion blender mixer (Bamix Gastro 200). The resulting slurry was mixed and further homogenised with the remaining 2 L of extraction solution using a polytron (Kinematica Polytron PT 10 35 GT). The resulting slurry solution was aliquoted into 1 L polypropylene tubes (Sorvall 1000 mL) and centrifuged at 4000 g for 15 min at 30° C. in an Eppendorf 5804R centrifuge. The organic phases were filtered through filter paper (Whatman 595 1/2) and were combined. The organic solvent was then evaporated from the oil using a Büchi Rotavapor R-300 system at 60° C. (B-300 heating bath, I-300 vacuum controller, V-300 pump and P-314 recirculating chiller operated at 4° C.). The vacuum was stepwise adjusted until it reached 10 mbar to avoid boiling of the sample.

Production of Pressed Crude Sunflower Oil 2 kg commercially available sunflower seed cultivated for oil production was pressed on a Rommelsbacher OP-700 kitchen press. The crude oil was heated to 30° C., centrifuged at 15,000 g for 15 min and filtered through Whatman 595% filter paper and let stand for 7 days at 6° C. Then the clear upper phase without the sediment was taken and centrifuged at 15,000 g for 15 min at 6° C. The resulting clear upper phase (90 volume %) was used in our experiments.

Industrially Produced Crude Palm Oil

Industrially produced crude palm oil was purchased from a vegetable oil supplier and was used as such.

Production of Crude Palm Stearin

Crude palm oil was left at room temperature for 48 h. The solid and liquid phases were then separated by centrifugation at 15000 g at 23° C. for 15 min. The resulting solid phase was labelled as crude palm stearin.

Mitigation Trials

Washing of Crude Oils with Auxiliary Oil

The primary triacylglyceride oil and the auxiliary oil were mixed in 1:1 w/w. The mixture was heated to 90° C. to allow complete melting. The sample was then homogenized by vortexing for 10 sec and then incubated for 7 h at room temperature~22° C. The crystallised solid and liquid phases were separated by centrifugation at 15000 g for 15 min at room temperature ~22° C.

Removal of Chlorinated Precursors with Auxiliary Trapping Agent MonoStearin

10% w/w of commercially available monostearin (Dimodan HS K-A from Danisco) was added to the crude oil. The mixture was heated to 90° C. to allow complete melting. The sample was then incubated for 7 h at 40° C. The crystallised solid and liquid phases were separated by centrifugation at 15000 g for 15 min at 40° C.

Dose-Response Experiments with Polar Interferences

The primary triacylglyceride oil (either before or after washing) was mixed with low quantities (0-3% w/w range) of polar interferences, such as free fatty acids (linoleic acid, LA; linolenic acid, Ln) or monoacylglycerols (monolinolein, mLA; monolinolenin, mLn) liquid at room temperature. Following the mixing, the samples were heated to 90° C. to allow complete melting and vortexed to allow homogenization.

In-Ampoule Heat Treatment of Samples

The heat treatment of crude oil samples was performed in sealed glass ampoules under nitrogen for 2 h at 230° C. in an Eppendorf 5804R centrifuge. The glass ampoules were fabricated from glass Pasteur pipettes by flushing them with nitrogen and sealing them using a Bunsen gas burner. These conditions were chosen in order to mimic the thermal conditions used during edible-oil deodorisation.

Liquid Chromatography—Mass Spectrometry Analysis

Sample Preparation

Oils and home-produced crude oils were diluted stepwise prior to injection. Firstly, 100 µL of each sample was transferred into a vial and 900 µL of a mixture of n-Hexane:Acetone (1:1 v/v) was added. The sample was vortexed for 5-10 s. In the second step, this solution was further diluted by mixing a 50 µL aliquot and with 950 µL of acetone. The obtained solution was vortexed for 5-10 s. The final dilution step consisted of mixing the following:

100 µL solution obtained after the second dilution step;

10 µL of a 0.2 ng/µL internal standard solution (1-oleoyl 2-linoleoyl 3-chloropropanediol-$^2H_5$); and 90 µL of methanol LC Conditions Ultra high performance liquid chromatography was performed using a ThermoFisher Accela system equipped with a silica based octadecyl phase (Waters Acquity HSS C18, 1.7 µm; 2.1×150 mm). The applied solvent gradient is summarised in Table 1.

TABLE 1

Details of the applied LC gradient (solvent A was 1 mM ammonium-formate in methanol; and solvent B was 100 µM ammonium-formate in isopropanol).

| Time [min] | Solvent A [%] | Solvent B [%] | Flow rate [µL/min] |
|---|---|---|---|
| 0 | 100 | 0 | 400 |
| 15.0 | 100 | 0 | 300 |
| 18.0 | 50 | 50 | 200 |
| 25.0 | 0 | 100 | 200 |
| 32.5 | 0 | 100 | 180 |
| 33.0 | 0 | 100 | 150 |
| 35.0 | 100 | 0 | 150 |
| 40.0 | 100 | 0 | 400 |
| 42.0 | 100 | 0 | 400 |

MS Conditions

Monitoring of monochloropropandiol (MCPD) esters and their organic precursors was performed using a Thermo Fisher Lumos Orbitrap mass spectrometer. This platform enabled analysis up to 240,000 Full Width at Half Maximum mass resolution and a routine mass accuracy of 2 ppm. The precursors of MCPD esters were detected in negative ion mode electrospray ionisation (ESI$^-$), while MCPD esters were monitored in ESI positive ion mode (ESI$^+$). Under these conditions the observed MCPD precursor ion was [M-H]$^-$, whereas the monitored MCPD ester ions were the [M+NH$_4$]$^+$ and [M+Na]$^+$ adducts. For data interpretation the m/z signals were extracted in a 10 ppm window. The summary list of chlorinated precursors investigated herein is listed in Table 2.

TABLE 2

| Designation | m/z of monitored ion [Thomson/Dalton] | Retention time [min] |
| --- | --- | --- |
| 642 | 642.52273 | 4.3 |
| 734 | 734.60709 | 5.7 |
| 716 a | 716.59653 | 6.2 |
| 718 a | 718.61161 | 6.6 |
| 718 b | 718.61161 | 7.6 |
| 716 b | 716.59607 | 8.0 |
| 732 | 732.62744 | 8.7 |
| 746 a | 746.64296 | 8.8 |
| 700 a | 700.60161 | 10.0 |
| 746 b | 746.64325 | 10.1 |
| 700 b | 700.60161 | 11.1 |
| 850 | 850.64170 | 18.1 |

Results & Discussion
Removal of Chlorinated Precursors

Example 1

The monostearin based trapping and removal of chlorinated precursors was performed in triplicates on solvent extracted crude palm oil, as per described above. First, the signal of the most prominent substance, with the m/z 718.61357 (Food Additives and Contaminants in Vol. 28, No. 11, November 2011, 1492-1500) was monitored as described above. The recorded peak areas of this precursor were extracted at 10 ppm m/z window, then they were normalized by defining the averaged peak areas in the starting material (without mitigation, no monostearin) as 100%. The obtained results show that the monostearin based trapping can remove in this case about 50% of 718 precursors.

The same crude palm oil sample was also subjected to washing with pressed sunflower oil and a subsequent monostearin based purification step. As the data shows, the efficacy of removing the 718 precursor improves and reaches 90% removal rate, see FIG. 1.

These results suggest that there is a synergistic purification effect between the monostearin based trapping and washing steps.

Example 2

Figure 2:
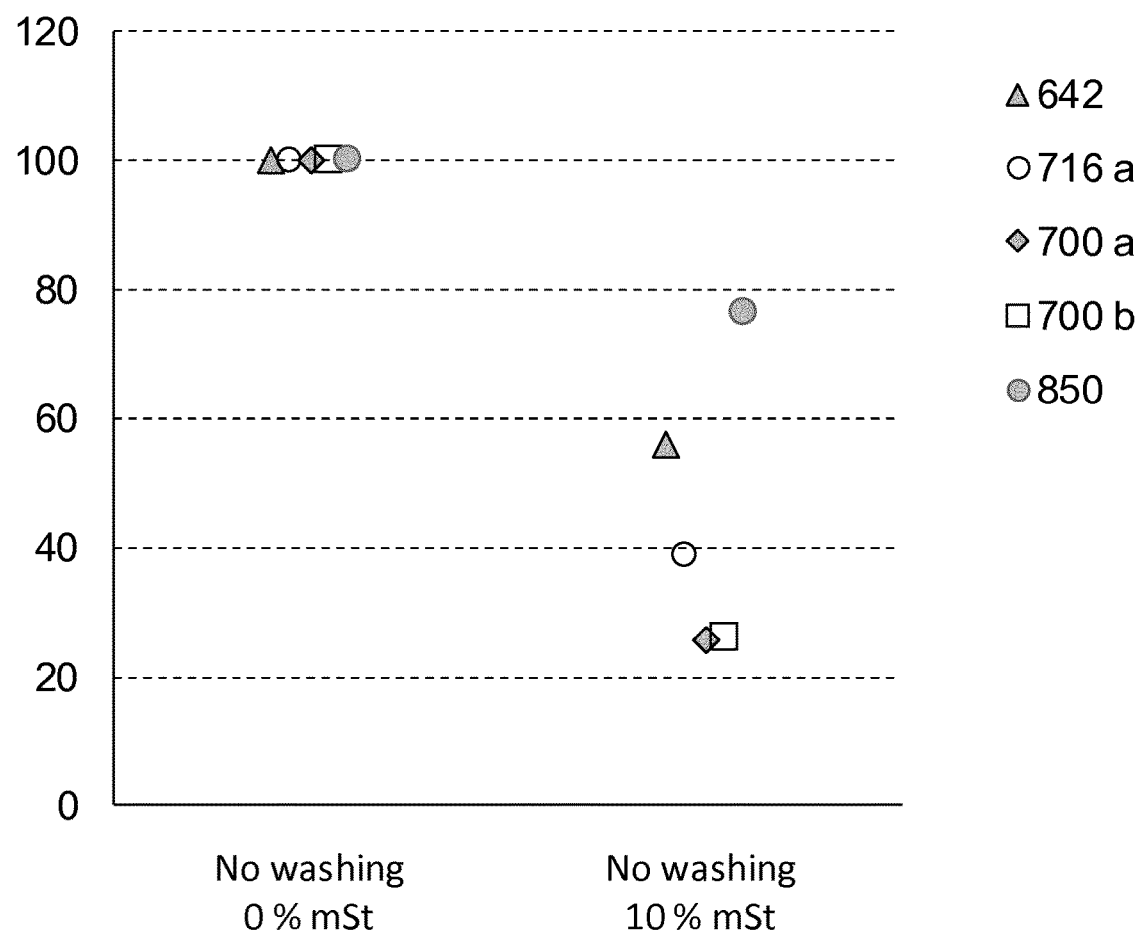
Figure 3:
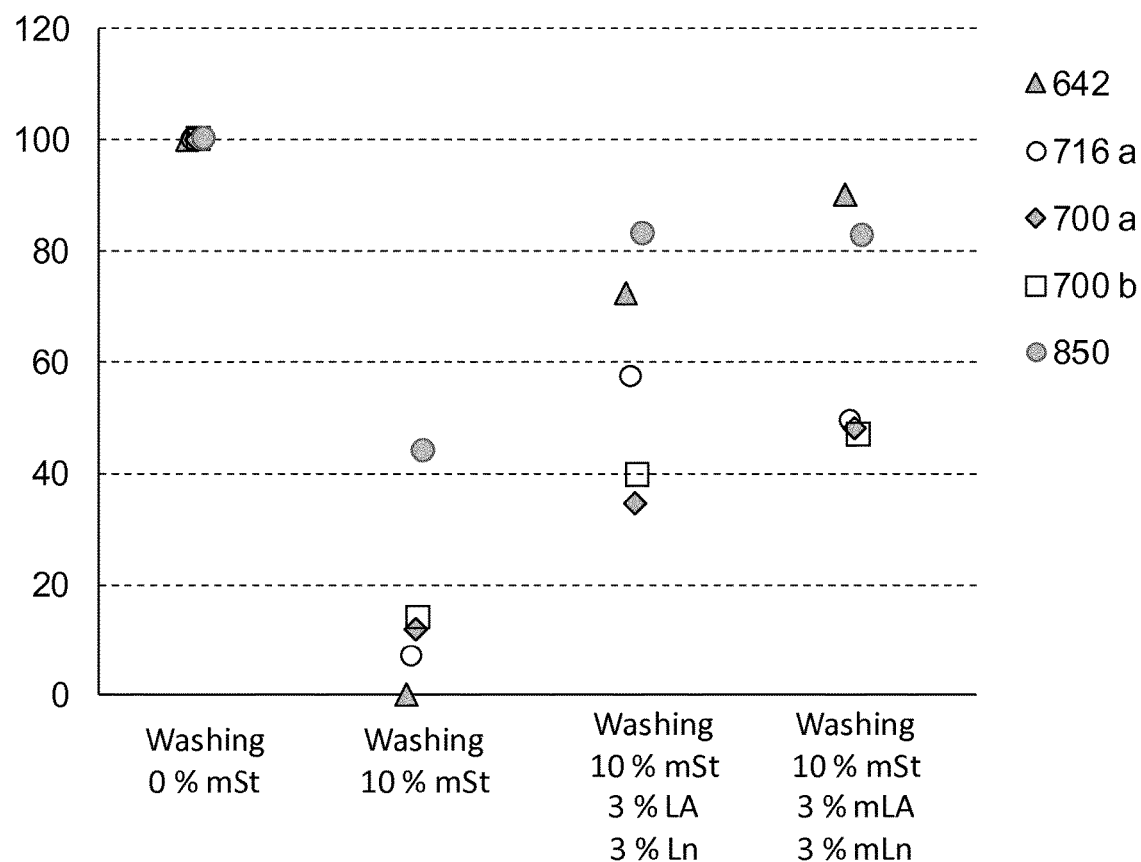

The synergistic purification effect between the monostearin based trapping and washing steps can be caused by minor polar substances present in the starting oil. This is demonstrated in another example, where first the mitigation efficacy of monostearin based trapping was measured in an industrially produced crude palm oil, see FIG. 2.

Then the same crude palm oil was washed with crude sunflower oil as washing agent as described above and enriched with 3% w/w quantity of polar interferences such as free linoleic acid (LA), free linolenic acid (Ln), monolinolein (mLA) and monolinolenin (mLn).

On one hand, the improved mitigation efficacy and synergy between washing and monostearin trapping is observed again, by showing improved mitigation for the precursors at m/z 642.52273; 716.59653; 700.60161; 850.64170.

On the other hand, the results confirm that mitigation efficacy is strongly deteriorated by both either the addition of free fatty acid or monoglyceride interferences.

Figure 4:
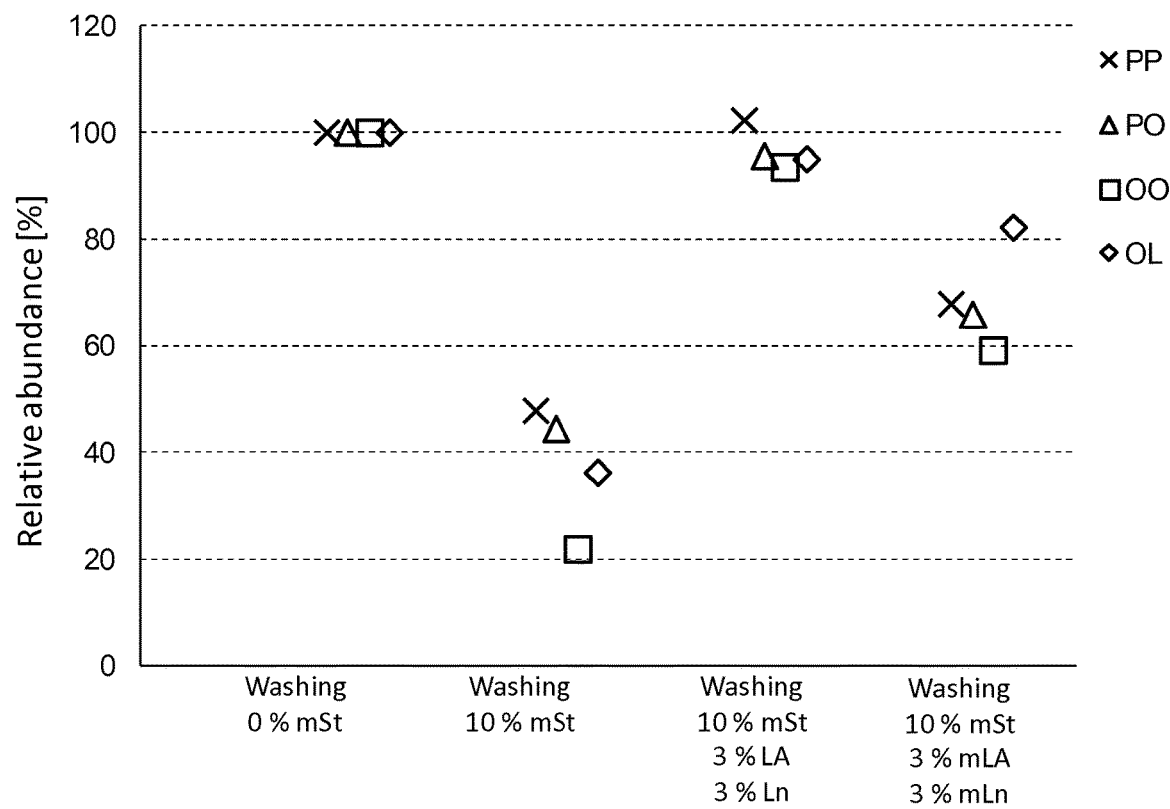

In order to verify the positive impact of mitigation on the MCPDE levels of the oils, the same samples have been also subjected to heat treatment and were analysed for their MPCDE content, as described above. While the monostearin based trapping purification has strong positive effect on the MCPDE levels, the negative effect of the added free fatty acids and monoglycerides was also confirmed, see FIG. 4. (dipalmitoyl-MCPD=PP-MCPD, palmitoyl-oleyl-MCPD=PO-MCPD, dioleyl-MCPD=OO-MCPD, oleyl-linoleyl-MCPD=OL-MCPD).

Example 3

Figure 5:
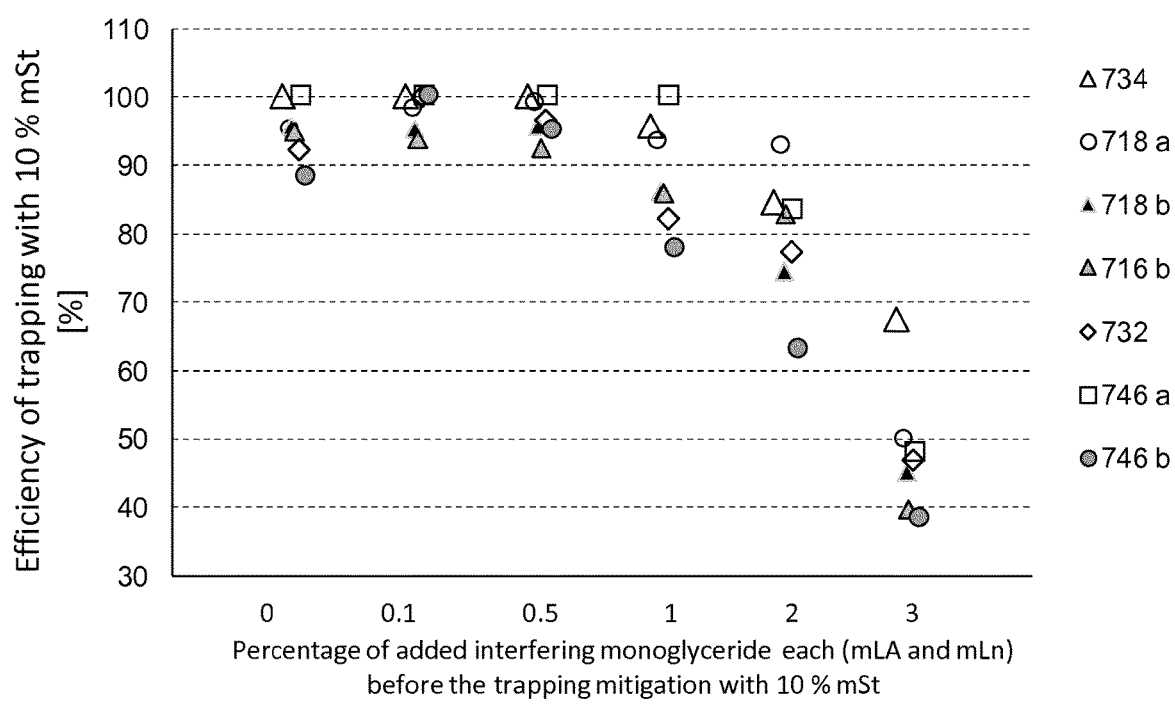

A more detailed dose-effect relationship was investigated in the stearin fraction of industrially produced crude palm oil that has been washed with crude sunflower oil, as described above. The washed oil was enriched in different experimental schemes with 0, 0.1, 0.5, 1, 2, 3% w/w quantity of polar interferences of monolinolein (mLA) and monolinolenin (mLn) each. Then the resulting samples already spiked with the interferences were split into two aliquots and one of the aliquots were mitigated with 10% monostearin as described above. The peak areas for various chlorinated precursors were extracted and compared as "with-versus-without" monostearin mitigation. The peak area differences as observed between the non mitigated (0% monostearin) and mitigated (10% monostearin) samples were plotted in function of the dosed quantity of interferences (mLA and mLn). The results in FIG. 5 show that above 0.5% addition of mLA and 0.5 mLn significantly impairs the mitigation efficacy, confirming the role of these polar interferences in the mitigation of chlorinated precursors.

Example 4

Figure 6:
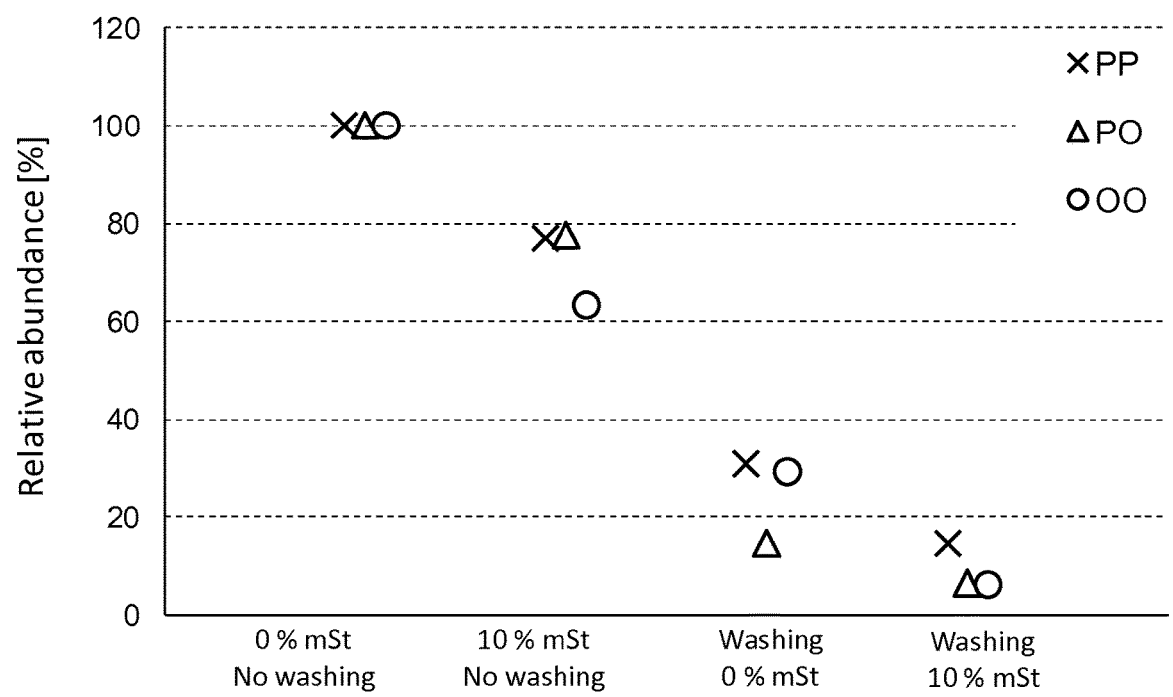

The overall step by step mitigation with washing and monostearin and their synergistic effect on the resulting MCPDE content of the oils was investigated in industrially produced crude palm oil. The crude palm oil first was mitigated only by monostearin based trapping, leading to about 30% decrease in the PP, PO and OO MCPDEs, see FIG. 6.

In a separate experiment, the same oil has been subjected to first washing with crude sunflower oil, leading to about 70% reduction of MCPDEs. Then, the washed oil has been subjected to monostearin based trapping purification yielding and overall 90% reduction in the investigated MPCDE levels.

Overall, the data show substantial reduction in the levels of both chlorinated precursors and monochloropropandiol esters (MCPDEs) after the mitigation compared to the levels observed in the absence of treatment for each of the studies on crude crude palm oil and crude palm stearin.

The benefit of this invention includes but is not limited to removing chlorinated substances with mass between 600-1000 Dalton and in any polarity range that is more polar that the triacylglycerols e.g. tripalmitin with retention time of 24.5 min. This is illustrated in Table 2 reporting the m/z values and corresponding chromatographic retention times reflecting the polarity of the investigated substances.

Example 5

Low-Melting Point Mono-Linolein and Mono-Olein can be Reduced by Washing.

Crude palm oil stearin and pressed crude sunflower oil was produced as described above. The crude palm stearin was washed with the pressed crude sunflower oil as follows:
the crude palm stearin and the pressed crude sunflower oil were mixed in 1:1 w/w. The mixture was heated to 90° C. to allow complete melting. The sample was then homogenized by vortexing for 10 sec and then incubated for 7 h at room temperature~22° C. The crystallised solid and liquid phases were separated by centrifugation at 15000 g for 15 min at room temperature~22° C. The washed solid phase was used for further work.

The crude palm stearin before and after the washing has been subjected to heat treatment and LC-MS analysis as described above.

The signals of the main monoacylglycerols were monitored as their [M+Na]+ adducts, see

TABLE 3

For data interpretation the m/z signals were extracted in a 10 ppm window.

| Designation | m/z of monitored ion [Thomson/Dalton] | Retention time [min] |
|---|---|---|
| mP, mono-Palmitin | 353.26623 | 1.3 |
| mS, mono-Stearin | 381.29753 | 1.5 |
| mO, mono-Olein | 379.28188 | 1.3 |
| mL, mono-Linolein | 377.26623 | 1.2 |
| mLn, mono-Linolenin | 375.25058 | 1.1 |

Figure 7:
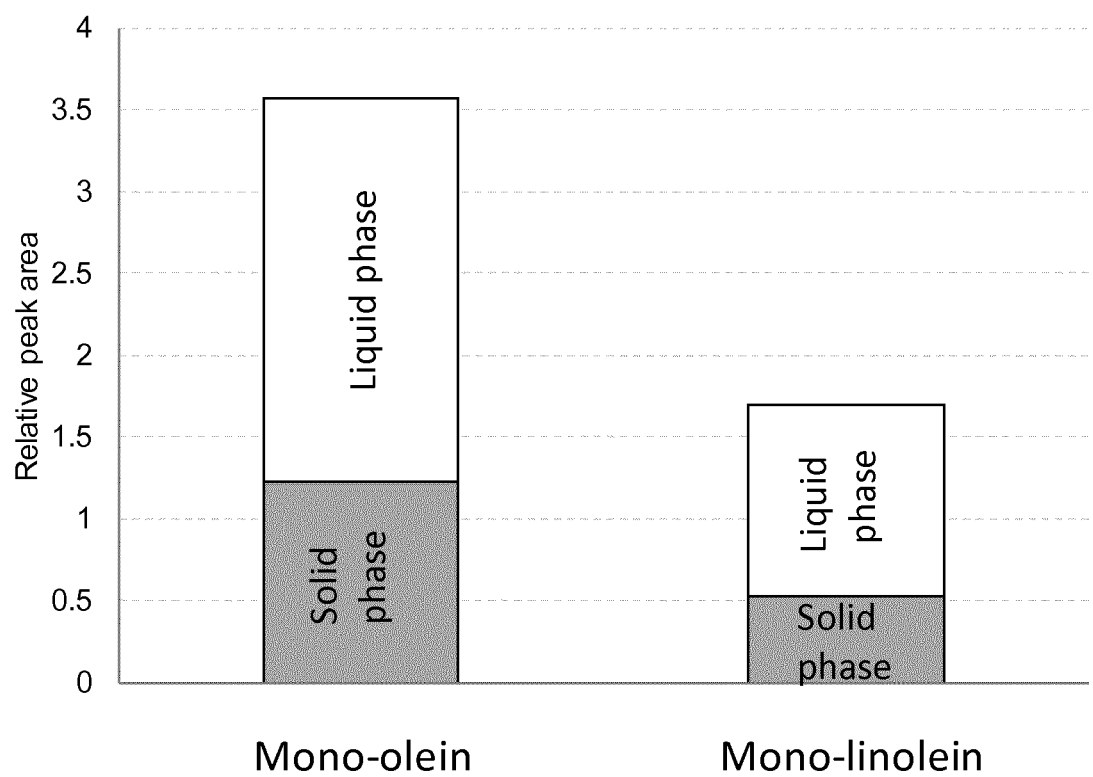

Table 3. Names, accurate masses and retention time of the monitored monoacylglycerols. The effect of washing on the abundance of mono-Olein and mono-Linolein is shown FIG. 7. The results show that following the crystallization of the mixture of crude palm stearin and pressed crude sunflower oil, mono-Olein and mono-Linolein are enriched in the liquid phase and hence are reduced in the solid crude palm stearin.

Example 6

Washing and trapping was demonstrated in crude palm oil.

Crude palm oil and pressed crude sunflower oil was obtained and produced as described above.

The washing of the crude palm oil was performed as follows: the crude palm oil and the pressed crude sunflower oil were mixed in 1:1 w/w. The mixture was heated to 90° C. to allow complete melting. The sample was then homogenized by vortexing for 10 sec and then incubated for 7 h at room temperature~22° C. The crystallised solid and liquid phases were separated by centrifugation at 15000 g for 15 min at room temperature~22° C. The washed solid phase was used for further work.

For mono-Stearin based trapping, 5% w/w of commercially available monostearin (Dimodan HS K-A from Danisco) was added to the washed palm oil. The mixture was heated to 90° C. to allow complete melting. The sample was then incubated for 7 h at 50° C. The crystallised solid and liquid phases were separated by centrifugation at 15000 g for 15 min at 40° C.

The palm oil before and after the washing and after the monostearin based trapping has been subjected to heat treatment and LC-MS analysis as described above. The signals of the mono-Olein, mono-Linolein and MPCDE as described above were extracted in a 10 ppm window.

Figure 8:
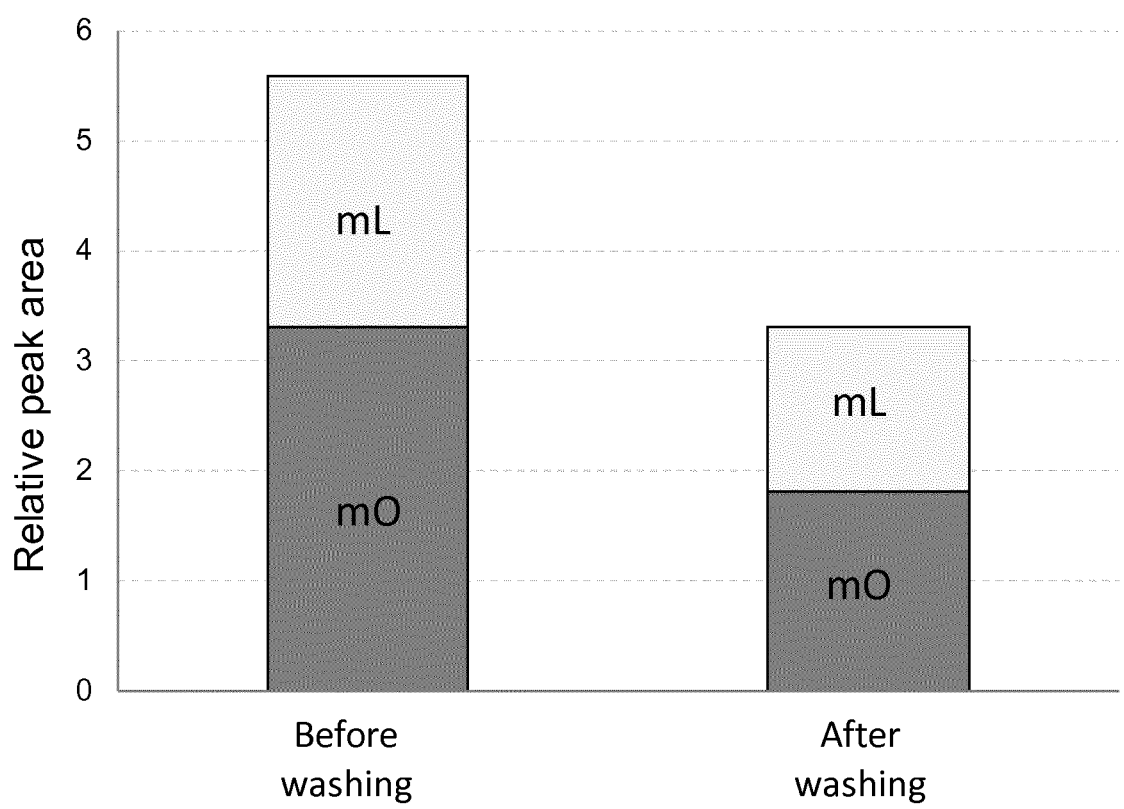

The effect of washing on the abundance of mono-Olein and mono-Linolein is shown in FIG. 8. The results show that following the washing procedure of crude palm oil both of its mono-Olein and mono-Linolein content is decreasing, hereby minimizing their interference with the subsequent mono-Stearin based trapping step.

Figure 9:
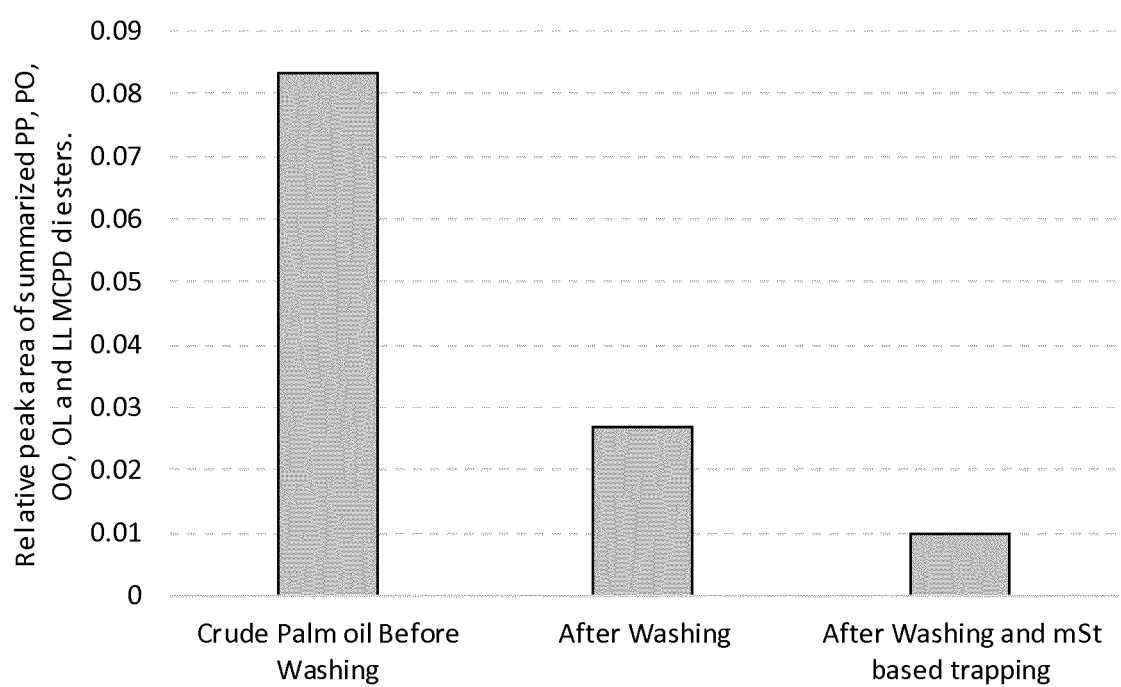

The results of the mono-Stearin based trapping step are shown in FIG. 9, showing the incremental decrease in MCPD levels and spanning a factor 8 reduction between starting material and final oil after washing and trapping step.

Example 7

Washing and trapping was demonstrated in degummed palm oil.

Crude palm oil and pressed crude sunflower oil was obtained and produced as described above.

The crude palm oil was degummed as follows:

The crude oil was first heated at 80° C. and then centrifuged at 15,000 g for 15 min at 40° C. The upper 90 v/v % liquid phase was immediately separated from the sediment and further used for degumming. Degumming of this oil was performed by first heating this oil to 80° C. and adding 0.02% phosphoric acid 85% (v/v). Then this mixture was sheared with a shear mixer (Silverson L5M-A) at 1500 rpm for 15 min while maintaining the crude oil at 80° C. Then 2% MilliQ water (v/v) was added and the mixture was further sheared at 1500 rpm for 15 min while maintaining its temperature at 80° C. The resulting degummed oil was centrifuged at 3,000 g for 2 min at 40° C. and the upper 80% purified oil was used for further work.

The degummed palm oil was washed with the pressed crude sunflower oil as follows:

The degummed palm oil and the pressed crude sunflower oil were mixed in 1:1 w/w. The mixture was heated to 90° C. to allow complete melting. The sample was then homogenized by vortexing for 10 sec and then incubated for 7 h at room temperature~22° C. The crystallised solid and liquid phases were separated by centrifugation at 15000 g for 15 min at room temperature~22° C. The washed solid phase was used for further work.

For the mono-Stearin based trapping, 5% w/w of commercially available monostearin (Dimodan HS K-A from Danisco) was added to the degummed and washed palm oil. The mixture was heated to 90° C. to allow complete melting. The sample was then incubated for 7 h at 50° C. The crystallised solid and liquid phases were separated by centrifugation at 15000 g for 15 min at 40° C.

The degummed palm oil before and after the washing and after the monostearin based trapping has been subjected to heat treatment and LC-MS analysis as described above. The signals of the MPCDE as described above were extracted in a 10 ppm window.

Figure 10:
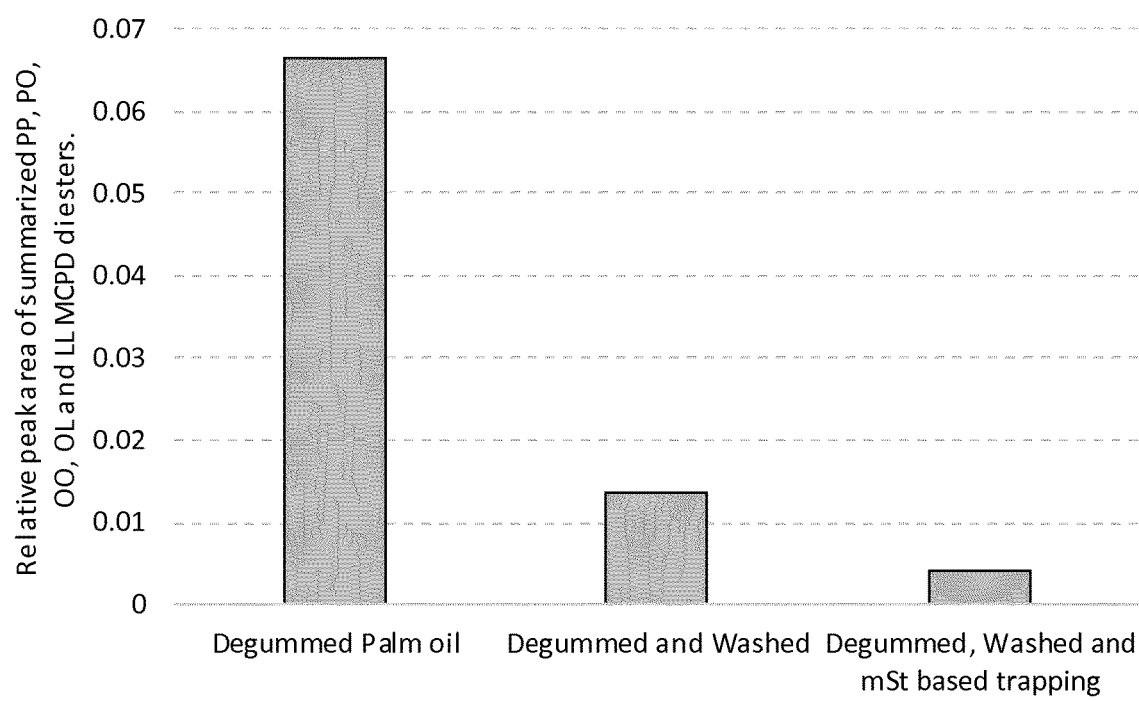

The results shown in FIG. 10, confirm that also in the case of degummed palm oil, an incremental decrease in MCPD levels is achieved spanning a factor 10 reduction between starting material and final oil after washing and trapping step.

All publications mentioned in the above specification are herein incorporated by reference. Various modifications and variations of the disclosed methods, uses and products of the invention will be apparent to the skilled person without departing from the scope and spirit of the invention. Although the invention has been disclosed in connection with specific preferred embodiments, it should be understood that the invention as claimed should not be unduly limited to such specific embodiments. Indeed, various modifications of the disclosed modes for carrying out the invention, which are obvious to the skilled person are intended to be within the scope of the following claims.

The invention claimed is:

1. A method for purification of a primary triacylglyceride oil wherein a quantity of organic chlorinated precursors of monochloropropandiol esters (MCPDEs) is reduced in a purified primary triacylglyceride oil compared to the starting primary triacylglyceride oil, the method comprising:
(a) admixing a ratio of 1:1 w/w of the primary triacylglyceride oil and an auxiliary oil to form a mixture, wherein the melting temperatures of the auxiliary oil and the primary triacylglyceride oil are substantially different;
(ii) the auxiliary oil is soluble in the primary triacylglyceride oil; and
(iii) the auxiliary oil is substantially free of hydrolytic decomposition products of triacylglycerides that have similar or lower melting temperatures than the melting temperature of the primary triacylglyceride oil, or the auxiliary oil is substantially free of polar lipids that have similar or lower melting temperatures than the melting temperature of the auxiliary oil;
(b) heating the mixture to 90° C.;
(c) crystallizing either
(1) the primary triacylglyceride oil by cooling the mixture of step (b) below the melting temperature of the primary triacylglyceride oil but above the melting temperature of the auxiliary oil to form a product, wherein the auxiliary oil has a lower melting temperature than that of the primary triacylglyceride oil due to its higher degree of unsaturation or due to its shorter fatty acid chains in its constituents, or
(2) the auxiliary oil by cooling the mixture of step (b) below the melting temperature of the auxiliary oil but above the melting temperature of the primary triacylglyceride oil to form the product, wherein the auxiliary oil has a higher melting temperature than that of the primary triacylglyceride oil due to its lower degree of unsaturation or due to its longer fatty acid chains in its constituents; and
(d) separating solid and liquid phases of the product of step (c) to obtain the purified primary triacylglyceride oil.

2. The method of claim 1, after step (d), the method further comprising:
(e) optionally admixing the purified primary- triacylglyceride oil with an auxiliary trapping agent to form a mixture, wherein the mixture comprises the auxiliary trapping agent in an amount ranging from 2 wt % to 10 wt % of the mixture, the melting temperatures of the purified primary triacylglyceride oil and the auxiliary trapping agent are substantially different, the auxiliary trapping agent is soluble in the purified primary triacylglyceride oil, and the auxiliary trapping agent is more polar than the purified primary triacylglyceride oil;
(f) heating the mixture to 90° C.;
(g) optionally crystallizing
(i) the auxiliary trapping agent by cooling the mixture of step (f) below the melting temperature of the auxiliary trapping agent to form a product, wherein the auxiliary trapping agent has a higher melting temperature than that of the purified primary triacylglyceride oil; or
(ii) the purified primary triacylglyceride oil by cooling the mixture of step (f) below the melting temperature of the purified primary triacylglyceride oil to form the product, wherein the purified primary triacylglyceride oil has a higher melting temperature than that of the auxiliary trapping agent; and
(h) optionally separating solid and liquid phases of the product of step (g).

3. The method of claim 1, wherein the auxiliary oil is a triacylglyceride oil.

4. The method of claim 1, wherein the auxiliary oil is a fully refined vegetable oil.

5. The method of claim 1, wherein the auxiliary oil is a plant oil.

6. The method of claim 1, wherein the auxiliary oil is substantially free of the hydrolytic decomposition products of the tricylglycerides.

7. The method of claim 1, wherein the auxiliary oil is free of the hydrolytic decomposition products of the tricylglycerides.

8. The method of claim 1, wherein the auxiliary oil is free of free fatty acids, mono- and diglycerides, phospholipids, sphyngolipids, saccharolipids and their derivatives or mixtures.

9. The method of claim 1, wherein step (c) comprises crystallizing the primary triacylglyceride oil by cooling the mixture of step (b) below the melting temperature of the primary triacylglyceride oil but above the melting temperature of the auxiliary oil.

10. The method of claim 1, wherein step (c) comprises crystallizing the auxiliary oil by cooling the mixture of step (b) below the melting temperature of the auxiliary oil but above the melting temperature of the primary triacylglyceride oil.

11. The method of claim 1, wherein the melting temperature of the auxiliary oil is at least 10° C. lower than the melting temperature of the primary triacylglyceride oil.

12. The method of claim 2, wherein step (g) comprises crystallizing the auxiliary trapping agent by cooling the mixture of step (f) below the melting temperature of the auxiliary trapping agent but above the melting temperature of the purified primary triacylglyceride oil.

13. The method of claim 2, wherein step (g) comprises crystallizing the purified primary triacylglyceride oil by cooling the mixture of step (f) below the melting temperature of the purified primary triacylglyceride oil but above the melting temperature of the auxiliary trapping agent.

14. The method of claim 2, wherein the difference in log $P_{oct/wat}$ between the auxiliary trapping agent and the purified primary triacylglyceride oil is at least 1.

15. The method of claim 2, wherein the auxiliary trapping agent comprises at least one compound selected from the group consisting of a monoacylglyceride, a diacylglyceride and a free fatty acid.

16. The method of claim 1, wherein the primary triacylglyceride oil is selected from the group consisting of a plant oil, an animal oil, a fish oil and an algal oil.

17. The method of claim 2, wherein the purified primary triacylglyceride oil is selected from the group consisting of a palm oil, a palm olein, a palm stearin, a palm mid fraction and palm-derived oil.

18. The method of claim 2, wherein the admixing of step (e) comprises heating to a temperature greater than the melting temperatures of the purified primary triacylglyceride oil and the auxiliary trapping agent, and/or homogenising the mixture.

19. The method of claim 2, wherein the separating of step (d) and (h) comprises centrifuging, decanting and/or filtering.

20. The method of claim 2, wherein the pH of the purified primary triacylglyceride oil is adjusted before step (g).

21. The method of claim 6, wherein the auxiliary oil is substantially free of monoacylglycerides and free fatty acids.

22. The method of claim 7, wherein the auxiliary oil is free of monoacylglycerides and free fatty acids.

23. The method of claim 14, wherein the difference in log $P_{oct/wat}$ between the auxiliary trapping agent and the purified primary triacylglyceride oil is at least 2.

24. The method of claim 15, wherein the auxiliary trapping agent comprises at least one compound selected from the group consisting of monostearin, monopalmitin, monomyristin, monolaurin, distearin, dipalmitin, dimyristin, dilaurin, stearic acid, palmitic acid, myristic acid, and lauric acid.

25. The method of claim 15, wherein the auxiliary trapping agent comprises monostearin.

26. The method of claim 19, wherein the separating of step (d) and (h) comprises centrifuging.

27. The method of claim 1, wherein the admixing of step (a) comprises heating to a temperature greater than the melting temperatures of the primary triacylglyceride oil and the auxiliary oil, and/or homogenising the mixture.

28. The method of claim 1, wherein the pH of the primary triacylglyceride oil is adjusted before step (c).

\* \* \* \* \*